United States Patent
Tretheway et al.

(10) Patent No.: US 7,093,279 B2
(45) Date of Patent: Aug. 15, 2006

(54) METHOD AND SYSTEM FOR AUTOMATIC INVOCATION OF SECURE SOCKETS LAYER ENCRYPTION ON A PARALLEL ARRAY OF WEB SERVERS

(75) Inventors: James R. Tretheway, Hillsboro, OR (US); Kamal R. Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 870 days.

(21) Appl. No.: 09/821,503

(22) Filed: Mar. 28, 2001

(65) Prior Publication Data

US 2002/0188862 A1    Dec. 12, 2002

(51) Int. Cl.
*H04L 9/32* (2006.01)
*G06F 15/16* (2006.01)

(52) U.S. Cl. ............... 726/3; 726/27; 709/229; 715/513; 715/515

(58) Field of Classification Search ........ 709/217–219, 709/203, 225, 227–229, 238, 239, 246; 713/201; 726/3, 27; 715/513, 515
See application file for complete search history.

(56) References Cited

U.S. PATENT DOCUMENTS

| | | | |
|---|---|---|---|
| 5,805,803 A * | 9/1998 | Birrell et al. ............... | 713/201 |
| 5,963,915 A * | 10/1999 | Kirsch .......................... | 705/26 |
| 6,081,900 A * | 6/2000 | Subramaniam et al. ..... | 713/201 |
| 6,424,992 B1 * | 7/2002 | Devarakonda et al. ...... | 709/203 |
| 6,523,022 B1 * | 2/2003 | Hobbs .......................... | 707/3 |
| 6,631,424 B1 * | 10/2003 | McDonough et al. ....... | 719/330 |
| 6,686,932 B1 * | 2/2004 | Rath et al. ................... | 715/748 |
| 6,687,746 B1 * | 2/2004 | Shuster et al. .............. | 709/223 |
| 6,718,390 B1 * | 4/2004 | Still et al. .................... | 709/229 |
| 6,772,333 B1 * | 8/2004 | Brendel ....................... | 713/153 |
| 6,965,938 B1 * | 11/2005 | Beasley et al. ............. | 709/229 |
| 7,000,107 B1 * | 2/2006 | Hewett et al. .............. | 713/164 |

* cited by examiner

*Primary Examiner*—Emmanuel L. Moise
*Assistant Examiner*—Zachary A. Davis
(74) *Attorney, Agent, or Firm*—Blakely, Sokoloff, Taylor & Zafman LLP (57) ABSTRACT

A system is described for load balancing requests dispatched from Web pages containing multiple frames. The system includes a load balancer to receive client requests from a client browser via a network. The requests are dispatched by a Web page having a first frame and a second frame. The system further includes a number of servers coupled to the load balancer to process the requests routed by the load balancer. Each server executes a software code to generate a new uniform resource locator (URL) and return a redirect message with the new URL to the client browser in response to (1) a request received from a requesting frame to load data object for a target frame and (2) the owner of the requesting frame is different from the owner providing the data object. When the client browser receives the redirect message with the new URL, the browser dispatches a new request using the new URL to the server specified by the new URL.

17 Claims, 5 Drawing Sheets

METHOD AND SYSTEM FOR AUTOMATIC INVOCATION OF SECURE SOCKETS LAYER ENCRYPTION ON A PARALLEL ARRAY OF WEB SERVERS

BACKGROUND OF THE INVENTION

1. Field of the Invention

The present invention generally relates to communications over the Internet, and in particular, to providing secure communications between client computers and an array of servers.

2. Description of the Related Art

In the development of a large Web site supporting an Internet-based service, such as an e-commerce site or a telecommunications service site, scalability may be achieved by employing a parallel array of servers. Such large Web site may also employ a load balancer to receive client requests and then redirect the requests to one of the servers in the array which is least busy at the time the request is received.

Web developers may employ a technique known as frames to present multiple Web pages to a user within one browser screen. Frames technique enables partitioning of the entire browser screen into separate areas which are in effect separate Hypertext Markup Language (HTML) documents. The HTML documents loaded into the frames may be configured to enable one frame to load the other frame. However, if a Web site employing frames technique is hosted in a parallel array of servers, the ability of one frame to load another frame may be prohibited by the Web browser. This is due to the fact that Web browsers such as Microsoft Internet Explorer or Netscape Navigator enforce owner/domain permission regulation.

To facilitate the transfer of data objects between servers on the Internet and client browsers, Hypertext Transfer Protocol (HTTP) is often used. However, the use of HTTP to transmit private or sensitive information may not be desired since HTTP does not provide secure connection between the client's browser and the Web servers. A secure connection to a Web site may be established by invoking Hypertext Transfer Protocol Secure (HTTPS) which provides secure communication through a security mechanism commonly known as SSL (Secure Sockets Layer). If multiple-framed Web pages are hosted in a parallel array of servers, the ability of one frame to load another frame using different communication protocol may be prohibited by the Web browser due to the concept of ownership imposed by browsers as noted earlier.

DETAILED DESCRIPTION OF THE INVENTION

In the following description, specific details are set forth in order to provide a thorough understanding of the present invention. However, it will be apparent to one skilled in the art that the present invention may be practiced without these specific details. In other instances, well-known circuits, structures and techniques have not been shown in detail in order to avoid obscuring the present invention.

Figure 1:
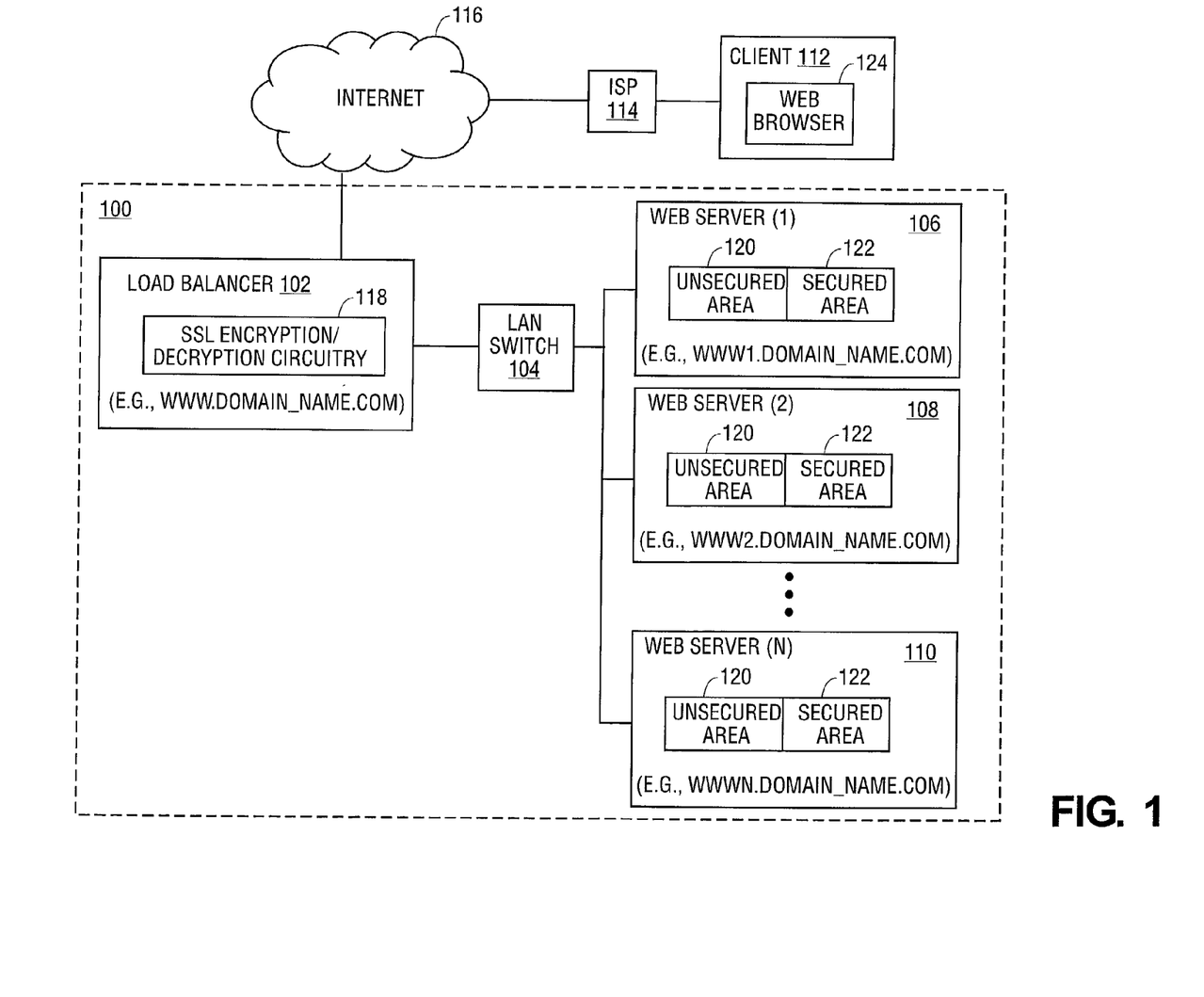
FIG. 1 is a block diagram of a system for supporting a Web site according to one embodiment of the invention.

FIG. 1 depicts a system 100 for supporting a Web site according to one embodiment of the invention. The system 100 includes a parallel array of Web servers 106 through 110 connected via a local area network (LAN) switch 104. Also included in the system 100 is a load balancer 102 which is connected on one side to the Internet 116 and on the other side to the LAN switch 104. In one embodiment, the load balancer 102 is Intel® NetStructure™ 7180 load balancer available from Intel Corporation of Santa Clara, Calif. The system 100 can receive client requests from a number of client users 112. Each client environment typically includes a computer (e.g., personal computer) and an Internet browser 124 (e.g., Netscape navigator, Microsoft Internet Explorer) running in the computer to access the Internet 116 via an Internet Service Provider 114.

In one embodiment, a virtual domain name is assigned to designate the load balancer 102 (e.g., www.domain_name.com) and each server 106 through 110 is uniquely addressable by a physical domain name (e.g., www1.domain_name.com, www2.domain_name.com, www3.domain_name.com through wwwn.domain_name.com). Other domain name configurations may also be used.

In use, the load balancer 102 receives service requests received from clients over the Internet that are directed to the virtual domain name (e.g., www.domain_name.com) or IP address assigned to the load balancer. The load balancer 102 sends the requests as they arrive to whichever Web server 106 through 110 in the array is least busy at the moment. In one implementation, if any Web server in the array fails, the load balancer detects the failure, and sends requests to any one of the remaining operational Web servers.

The Web site supported by the system 100 may require the client 112 to transmit over the Internet 116 private or personally identifiable information (PII), such as name, address, telephone number, credit card number etc. To prevent a third party from viewing or obtaining such private or sensitive information, there is a need to provide a secure way of communicating between the client 112 and the Web site. One way of establishing a secure connection between a client's browser 124 and a Web server is by using a security protocol such as Secure Sockets Layer (SSL).

In the illustrated embodiment, because the SSL encryption and decryption algorithms are computationally expensive and may impact the performance of the Web servers 106–110 in the parallel array, a load balancer, such as for example Intel® NetStructure™ 7180 load balancer, capable of performing SSL encryption and decryption using hardware-based accelerator circuitry 118, is utilized. In this embodiment, the communication between the load balancer 102 and the Web servers 106–110 may be transmitted as "cleartext" (i.e., unencrypted) if adequate physical security exists between the Web servers 106–110 and the load balancer 102. In other words, establishing a secure connection between the load balancer 102 and client's browser 124 may be necessary during exchange of private or sensitive information; however, a secure connection between the Web servers and the load balancer may not be necessary.

Typically, Hypertext Transfer Protocol (HTTP) is used to facilitate the transfer of data objects between servers on the Internet and client browsers. Although HTTP is often used on the Internet, it is not an especially secure protocol. A secure connection to the Web site may be established by invoking Hypertext Transfer Protocol Secure (HTTPS). HTTPS is a protocol that provides secure communication through a security mechanism commonly known as SSL (Secure Sockets Layer). Because Internet users usually access Web sites using HTTP protocol by entering HTTP URL (uniform resource locator) (e.g., http://www.domain_name.com) instead of invoking the HTTPS protocol by entering HTTPS URL (e.g., https://www.domain_name.com), it may be desirable to automatically redirect the client's browser to a secure connection to the Web site in situations where private or sensitive information may be exchanged between the client's browser and the Web server.

For developer testing purposes, it may be useful to enable developers to access individual Web servers of the parallel array (e.g., by a URL such as http://www1.domain_name.com). In this situation and according to one embodiment of the invention, HTTPS protocol may not be invoked when a physical domain name has been specified because the load balancer containing the SSL hardware will be bypassed, and the individual Web servers in the parallel array are configured for only non-secure access (e.g., HTTP protocol).

Figure 2:
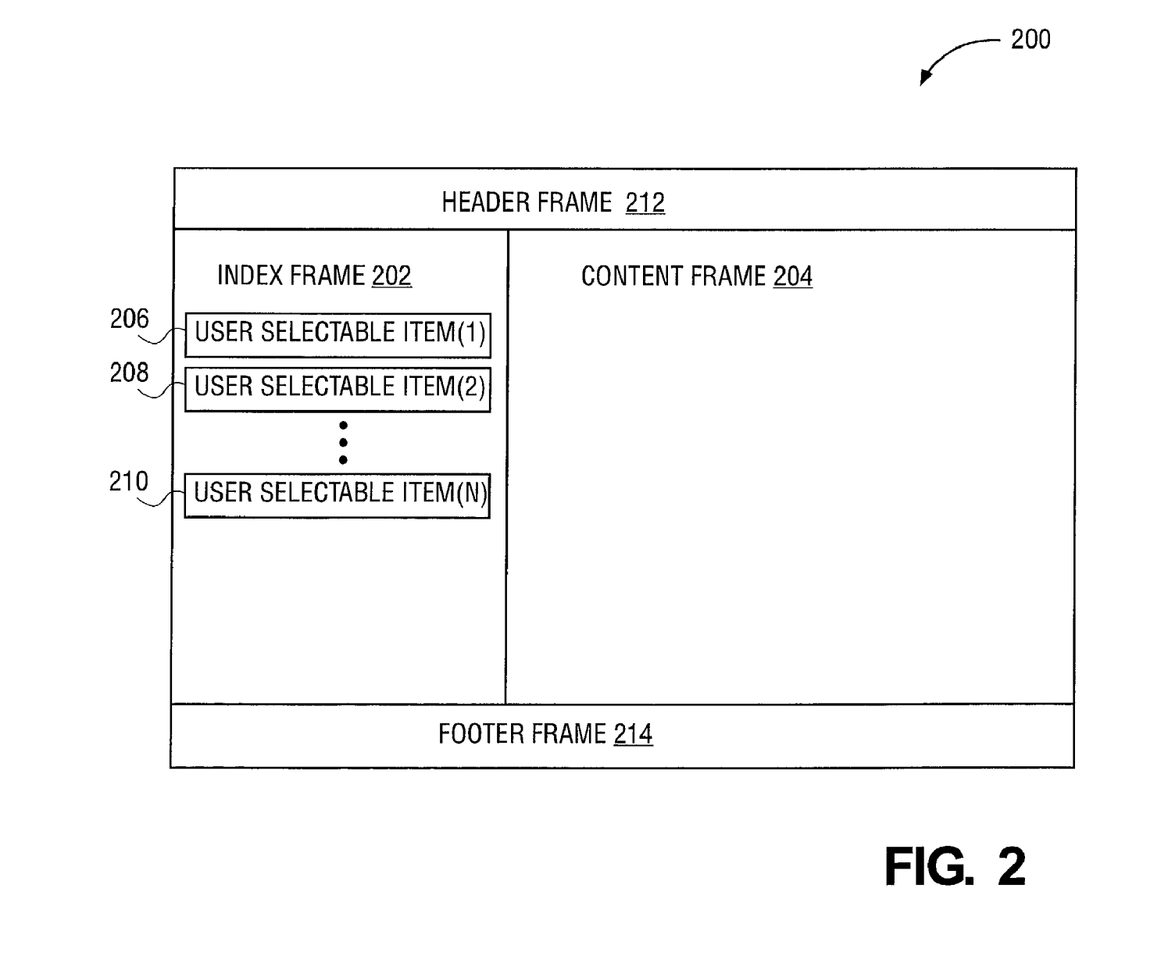
FIG. 2 is an example of a Web page employing frames technique to partition a single browser screen into separate areas.

FIG. 2 depicts an example of a Web page 200 employing frames technique to partition a single browser screen into separate areas. Frames enable Web developers to partition the entire Web screen into separate areas which in effect are separate HTML documents. Associated with each frame are capabilities such as linking to another frame or Web site. The Web page shown in FIG. 2 includes an index frame 202, shown on the left-hand side of the display, listing a number of user selectable items 206 through 210 that a user can select from and a content frame 204, shown in the middle of the display, displaying detailed information related to the item selected in the index frame 202. The framed Web page may also include a header frame 212 located at the top portion of the display and a footer frame 214 located at the bottom of the display. Each frame has associated with it a URL (uniform resource locator) of where the document came from.

Typically, an HTML document contained within each frame includes a number of URL embedded items that a user can select, each associated with a hyperlink to another HTML document. For example, when a user points and clicks on one of the user selectable items 206–210 in the index frame 202, the code embedded with the item may trigger reloading of the index frame 202 with a new HTML document or alterntively, the content frame 204 with new HTML document relating to the item that was chosen.

To access a data object (e.g., HTML document) from the parallel array of Web servers, a uniform resource locator (URL) specified by the browser may be sent to the load balancer 102 or directly to one of the Web servers 106–110. An anatomy of a fully qualified URL may appear in the following format: [<protocol>://<host>:<port>/<script>?<search>#<hash>]. In this format, a fully qualified URL consists of six components; the protocol, host name, port ID, script name, search string and hash indicator. The protocol portion of the URL identifies which protocol (e.g., HTTP or HTTPS) is being utilized. The host portion may contain a domain name of the load balancer (e.g., www.domain_name.com) or a domain name of the one of the servers in the parallel array (e.g., www1.domain_name.com). The port portion of the URL identifies a port number for the protocol being used. A well-known port number for HTTF protocol is 80 and a well-known port number for HTTPS protocol is 443. The script portion of the URL is the full path name of the HTML file or Common Gateway Interface (CGI) script being invoked on the web site.

There are various ways to load one frame from another frame. For example, JavaScript coding may be used to supply the new URL for the frame to be loaded. JavaScript code embedded in the index frame 202 like the following example in TABLE 1 can be used to repaint the content frame 204 by invoking the "Account Info" CGI script action. The new URL shown in this example, "/cgi-bin/AccountInfo.cgi", is not a fully qualified URL because it only contains the name of the CGI script to invoke.

TABLE 1

```
<SCRIPT LANGUAGE="JavaScript">
<!-- hide script from old browsers
    function ViewAccountInfo( ) {
        parent.frames["content"].document.location.href =
            "/cgi-bin/AccountInfo.cgi";
    }
//-->
</SCRIPT>
Click <A HREF="javascript:ViewAccountInfo( )">here</A> to view
your account information.
```

When software code does not provide a fully qualified URL as shown in the previous example in TABLE 1, the current values of the current URL are substituted for the missing items. As an example, if a user had first accessed "https://www.domain_name.com" and the load balancer has forwarded this request to, for example, "www1.domain_name.com", then the current URL as far as "www1.domain_name.com" is aware would be "http://www1.domain_name.com". In this regard, missing items such as the protocol portion of the URL will be changed from HTTPS to HTTP and the host name from "www.domain_name.com" to "www1.domain_name.com". When the substitution occurs from the JavaScript code fragment above, it would use a new URL of "http://www1.domain_name.com/cgi-bin/AccountInfo.cgi".

There are a number of problems associated with substituting missing components of URL. First, since the protocol portion of the URL can be unintentionally changed from HTTPS to HTTP, the user may now be accessing an unencrypted version of the Web site, and will not benefit from the privacy benefits of SSL encryption and decryption. Secondly, the assignment statement in the ViewAccountInfo( ) function in TABLE 1 may fail with a "domain ownership error" because the frame may be repainted with a different Internet domain name than it had previously, i.e., by a different "foreign" frame.

A Web site hosted by the Web servers in FIG. 1 may include unsecured areas 120 (e.g., visitor area) that provide general information about the service the Web site provides and secured areas 122 (e.g., members area) that may require exchange of private or sensitive data between the Web servers and client computers. For example, registered members of the Web site may use the secured area (e.g., members area) to log into and view their account history or to change their profiles. Although users may be allowed to browse around the unsecured area 120 (e.g., visitor area) of the Web site in unsecured mode, it may be desirable to automatically switch to HTTPS protocol when the user enters the secured area 122 (e.g., members area).

One way of invoking HTTPS protocol is by specifying HTTPS in the protocol portion of a fully qualified URL. A number of problems may be encountered during development of software to automatically switch a user from HTTP to HTTPS. As noted earlier, one problem arises from the fact that browsers that exist today have this concept called ownership. When frames are displayed by a browser (e.g., Microsoft Internet Explorer or Netscape Navigator), an owner is associated with each frame. The owner may be the domain name or IP address associated with the Web server that is being accessed. The owner may also be associated with the type of protocol currently being used.

The existing browsers typically prohibit a requesting frame from loading data object for a target frame if the owner of the target frame (i.e., the protocol and server that were previously used to load the target frame) is different from the protocol and the server assigned by the load balancer to provide the data object. There are at least two situations in which the concept of ownership imposed by the browser may prevent one frame from loading another frame. In one situation, one frame operating under HTTP protocol tries to load another frame using HTTPS protocol, or vice versa. For example, when a user first arrives at a Web site, if the URL of the index frame is http://www.domain_name.com/visitor_menu.html, then the browser will assume that the index frame is currently owned by the domain called http://www.domain_name.com. For example, if a user tries to load the content frame with https://www.domain_name.com by clicking on an item in the index frame to enter a secured area of the Web site, the browser will issue an error message indicating that the index frame does not have permission to override the contents of the content frame because the owner/domain associated with https://www.domain_name.com is different from the current owner/domain associated with http://www.domain_name.com.

In another situation, a requesting frame tries to load a target frame with data objects from a server that is different from the server that was previously used to load the target frame. This situation arises in cases where a load balancer is used to distribute client requests among a parallel array of Web servers. Suppose a client browser sends requests to the load balancer to retrieve a parent frame that contains instructions to build two child frames. When building such Web page having multiple frames, multiple URL requests from the browser will be sent to the load balancer, one for the patent frame and at least two subsequent URL requests to fill in the display for the child frames. Upon receiving such requests, the load balancer may decide that the first request should be serviced by one of the Web servers (e.g., www1) and that the second request received subsequent to the first request should be serviced by another Web server (e.g., www2), and so on. This means that one frame may be loaded from one server while the other frame may be loaded from another server. In this regard, since the load balancer is selecting the least busiest server for each request received from each individual frame, when a request is received from a requesting frame to load a target frame, the owner of the target frame may be different from the owner providing the data object. In this situation, the browser will return with in an error message indicating that the frame loading the target frame does not have valid ownership to load the target frame.

In one aspect of the invention, the present invention provides a way to overcome the problems associated with ownership enforced by the browser. The operations described herein may be carried out by executing software codes embedded within HTML documents. Alternatively, the operations may be carried out by executing codes executed on a Web server. Additionally, the operations performed by the present invention may be embodied in the form of software program stored on a machine-readable medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus. Moreover, the present invention is not described with reference to any particular programming language. It will be appreciated that a variety of programming languages may be used to implement the teachings of the invention as described herein, including Java Script, Visual Basic script by Microsoft, and Perl programming language.

Figure 3:
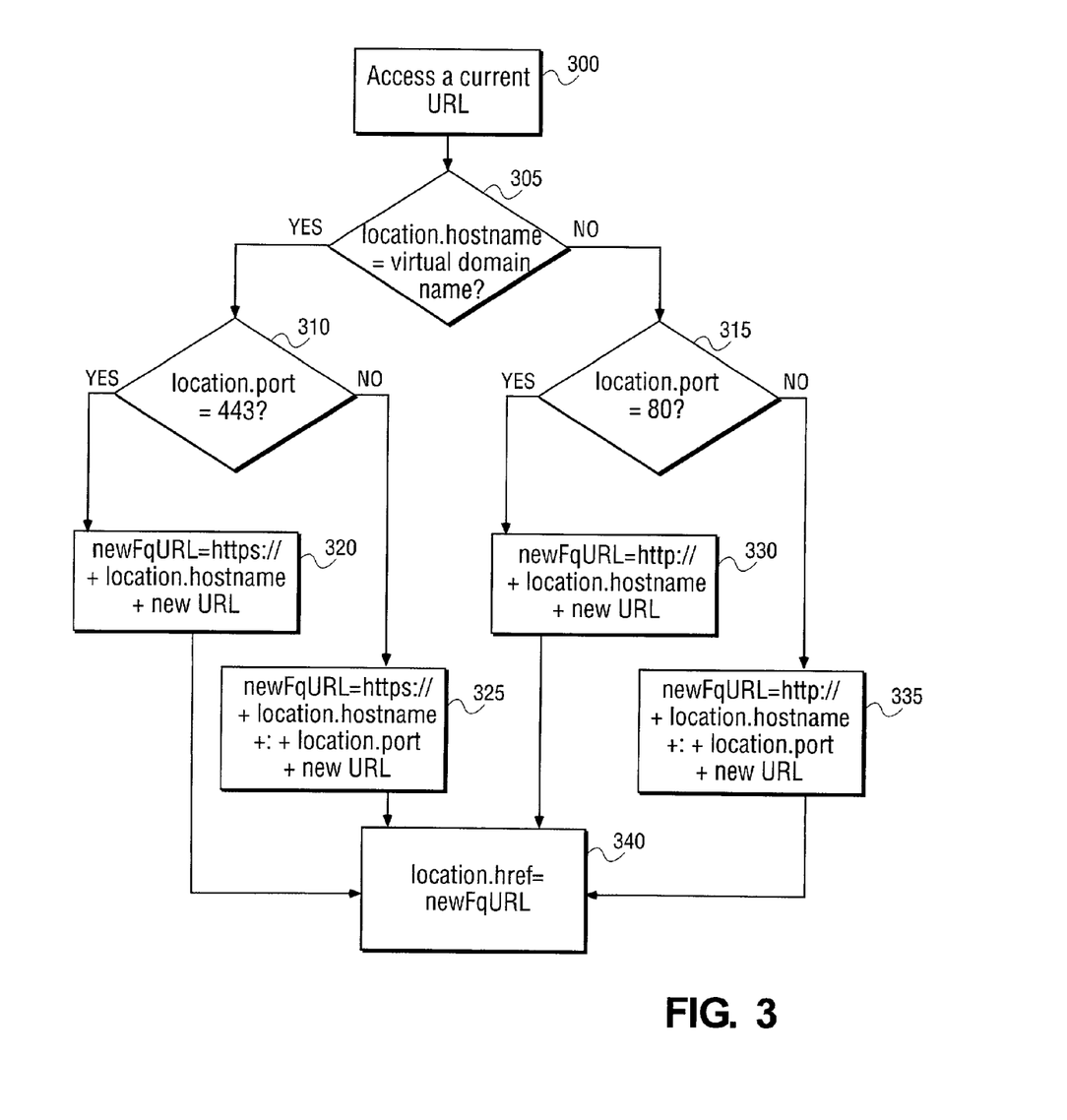
FIG. 3 is a flowchart of software code embedded within an HTML document to automatically switch from HTTP protocol to HTTPS protocol according to one embodiment of the invention.

Referring to FIG. 3, the operations of software code embedded within an HTML document to automatically switch from HTTP protocol to HTTPS protocol according to one embodiment of the invention are shown. To provide secure channel of communication between the client's browser and the Web server when a client user enters a secured area of the Web site from an unsecured area, some of the HTML pages of a Web site will include software codes embedded therein to enable the target frame processing the HTML page to automatically switch from HTTP protocol to HTTPS protocol. In block 300, the software code embedded within an HTML document accesses a uniform resource locator (URL) that was used to locate the HTML document. Then in decision block 305, the software code determines whether the URL corresponds to the domain name of the load balancer or to one of the servers in the parallel array. This task may be performed by examining a variable (e.g., location.hostname) that contains the domain name or IP address of server specified in the URL. If the client request was directed to the load balancer by specifying the virtual domain name of the Web site (www.domain_name.com), the software code proceeds to block 310.

If the client user is an internal tester accessing one of the Web servers by its physical domain name, then it may be desirable not to use SSL encryption since the load balancer that does the SSL encryption is being bypassed. In this regard, if a physical domain name (e.g., www1.domain_name.com, www2.domain_name.com through wwwn.domain_name.com) associated with one of the Web servers has been accessed directly (block 305, no), then the code proceeds to block 315. It should be noted that the domain name associated with the load balancer and Web servers shown in FIG. 1 and above example are just sample names, and may be different.

In decision block 310, the software code determines whether the standard port ID for HTTPS is used to access the virtual domain name. This task may be performed by examining a variable (e.g., location.port) that contains the port number specified in the client request. Typically, HTTPS communication is carried out in the well-known port 443. After determining that the client request is directed to the well-known port ID for processing HTTPS protocol, i.e., port ID of 443, then in block 320, the software code builds a new URL by concatenating "https://" with the virtual domain of the Web site and the new CGI script reference. Otherwise, if the port ID of 443 has not been used (block 310, no), the code proceeds to block 325 where a new URL is built by concatenating "https://" with the virtual domain name of the Web site, the non-standard port ID being used, and the new CGI script reference.

In decision block 315, the software code determines whether the standard port ID for HTTP is used to access the virtual domain name. Typically, HTTP communication is carried out in the well-known port 80. If the port ID of 80 has been used (block 315, yes), the code proceeds to block 330 where a new URL is built by concatenating "http://" with the domain name of the Web server and the new CGI script reference. Otherwise, if the port ID of 80 has not been used (block 315, no), the code proceeds to block 335 where a new URL is built by concatenating "http://" with the domain name of the Web server, the non-standard port ID being used, and the new CGI script reference. Once new URL has been built (blocks 420–435), the software code forces the target frame to be repainted with the new URL that has been built.

An example of JavaScript code that could be implemented for this purpose is shown below.

TABLE 2

```
<SCRIPT LANGUAGE="JavaScript">
<!-- hide script from old browsers
    function GoToURL(newURL, newFrame) {
        var newFqURL;
        if (location.hostname == "www.domain_name.com") {
            // access to Load Balancer virtual Web site
            if (location.port == 443) {
                // using well-known port ID
                newFqURL = "https://" +
                    location.hostname + newURL;
            } else {
                // using non-standard port ID
                newFqURL = "https://" +
                    location.hostname +
                    ":" + location.port + newURL;
            }
        } else {
            // direct access to Web server in array
            if (location.port == 80) {
                // using well-known port ID
                newFqURL "http://" +
                    location.hostname + newURL;
            } else {
                // using non-standard port ID
                newFqURL = "http://" +
                    location.hostname +
                    ":" + location.port + newURL;
            }
        }
        parent.frames[newFrame].document.location.href =
            =newFqURL;
    }
// -->
</SCRIPT>
```

In one implementation, the JavaScript code is embedded in HTML pages to enable each target frame processing such HTML page with proper ownership or authority to load itself with new HTML page (1) using different communications protocols and (2) retrieved from different Web server. The JavaScript version of the algorithm executes in the client browser, and is used whenever help from the server is not needed to determine that the target frame needs to be redirect to a new page; most typically, when the target frame is being forced to switch from HTTP to HTTPS.

For example, one of the HTML pages (e.g., visitor_menu.html) associated with the non-secure area of a Web site may include a link to enable the user client to "login" (i.e., enter the secure area of the Web site). Because the secure area of the Web site may require exchange of private or sensitive information (e.g., user ID and password), it is desirable that the data entry by the client is SSL secured, regardless of whether the user is on the HTTP or HTTPS version of the "visitor_menu.html" page. The automatically switching into HTTPS protocol may be accomplished by embedding into the "visitor_menu.html" page the JavaScript code shown in TABLE 3. This code is invoked when the user presses the "login" button. The code ensures that the correct HTTP or HTTPS mode is used depending upon the circumstances. In one implementation, the automatic switching the HTTPS protocol will be done only if the user is accessing the Web site using the virtual domain name (i.e., domain name of the load balancer which performs the SSL encryption). If the user is an internal tester accessing one of the Web servers by its physical domain name, then it may be desirable not to use SSL encryption since the load balancer that does the SSL encryption is being bypassed.

The example shown below is simplified in that it doesn't demonstrate handling of non-well-known port IDs for the protocols.

TABLE 3

```
<HTML>
<SCRIPT LANGUAGE="JavaScript">
    var nextUrl;
    function logIn( ) {
        if (location.hostname == "www.domain_name.com") {
            // we're on the virtual domain name, yes, let's switch to SSL
            nextUrl = "https://" + location.hostname + "/login.html";
        } else {
            // we're on an explicit server, no, don't use SSL
            nextUrl = "http://" + location.hostname + "/login.html";
        }
        parent.location.href = nextUrl;
        return true;
    }
</SCRIPT>
<BODY>
    <INPUT VALUE="Log_In" TYPE="button" onClick="javascript:logIn( );">
</BODY>
</HTML>
```

Figure 4:
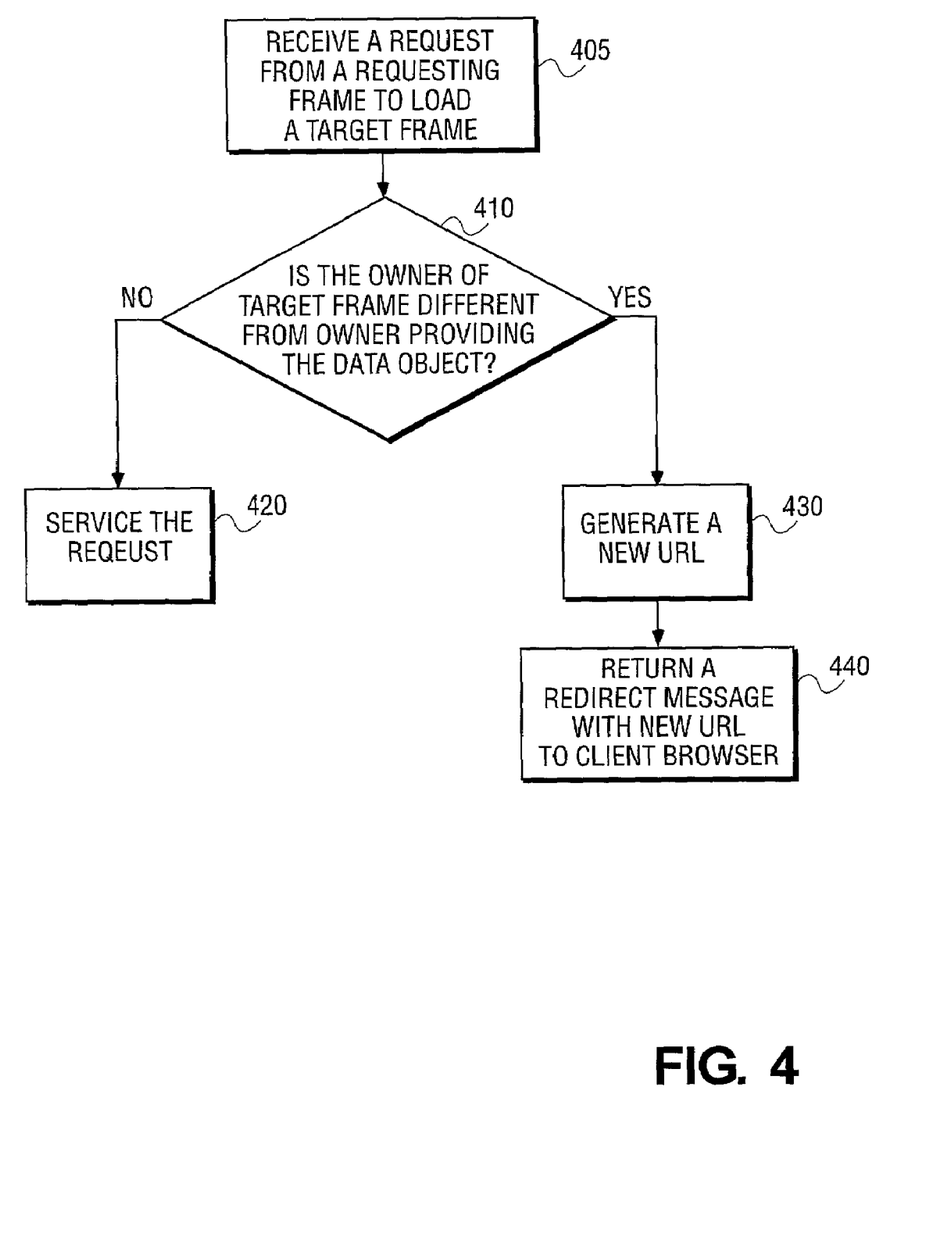
FIG. 4 is a flowchart of software code executed on a Web server to force a client browser to provide redirection according to one embodiment of the invention.

Referring to FIG. 4, operations of software code executed on a Web server to force a client browser to provide redirection according to one embodiment of the invention are shown. A Web page employing multiple frames may be displayed on a browser screen. By pointing and clicking on one of the user-selectable items in one of the frames, this may cause the requesting frame to dispatch a request to load another frame (i.e. target frame) with new data object from one of the servers. However, if the current owner of the target frame is different from the owner providing the data object, the browser will deny such request since it violates the owner/domain permission regulation that browsers enforce. To overcome this problem, software code is provided on the servers to generate a new URL and return a redirect message with the new URL to the client browser.

In block 400, a server receives a request from a requesting frame to load a target frame. In one embodiment, the software code running on the server determines if the owner of the target frame is different from the owner providing the data object in decision block 410. If the owners are different (block 410, yes), the software code generates a new URL (block 430) and returns a redirect message with the new URL to client browser (block 440). Once the client browser receives the redirect message with the new URL, the browser will dispatch a new request using the new URL to the server specified by the new URL. In this regard, the new URL is generated such that the server providing the data object will be the same server that currently owns the target frame. If it is determined that the current owner of the target frame is the same as the owner providing the data object (block 410, no), the server will service the request by sending the data object to the target frame.

In an alternative embodiment, the software code is configured such that a redirect message with a new URL will be generated each time one frame tries to load another frame with data object. In other words, in this alternative embodiment, the decision block 410 will be bypassed.

An example of program that could be executed on a Web server to provide redirection is shown below. This example is implemented in the Perl programming language; however, other programming language could also have been used.

TABLE 4

```
use CGI;
$cgi = new CGI;
sub RedirectTo {
    my ($url) = @_; # $_[0] contains the URL to make absolute
    my $new_url; # new fully-qualified URL constructed from $ url
    my $Web_server = "www.domain_name.com"; # virtual Web site name here
    my $Web_port = "80"; # port id being used for HTTP
    my $Web_secure = "443"; # port id being used for HTTPS
    # figure out protocol, host name, and port id to use.
    if ($Web_server eq $ENV{'HTTP_HOST'}) {
        # we are on the virtual domain name, we want security
        if ($Web_secure != 443) {# non-well-known port, specify it.
            $new_url "https://" .$ENV{'HTTP_HOST'}. ":" . $Web_secure;
        } else { # well-known port, don't specify it.
            $new_url = "https://" . $ENV{'HTTP_HOST'};
        }
    } else {
        # we came to a server directly, must be testing without security
        if ($Web_port != 80) { # non-well-known port, specify it.
            $new_url "http://" .$ENV{'HTTP_HOST'} .":" . $Web_port;
        } else { # well-known port, don't specify it.
            $new_url = "http://" .$ENV{'HTTP_HOST'};
        }
    }
    # figure out full path of $url, and tack onto the end of $new_url so far.
    if ($url =~ /^\//) { # if $url matches a string starting with slash
        # $ url is relative to the server's root, just use it.
        $new_url .= $url;
    } else {
        # $url relative to the current folder path, prepend path first.
        $script_path = $ENV{'SCRIPT_NAME'}; # get filename with full path
        $script_path =~ s/[^\/]*$//; # take filename off the end
        $new_url .= $script_path.$url; # put URL on end of current path
        $new_url =~ s/\/\.\/\//go; # change any "/./" to just "/"
        $new_url =~ s/[^\/]*\/\.\.\//go; # remove any "<dir> /../"sillies
    }
    return ($cgi->redirect($new_url)); # tell client browser to go there!
}
# call usage for "login" page example:
if (isAnExisting($cgi->param("userid"))) {
    if (isValid($cgi->param("password"), $cgi->param("userid"))) {
        RedirectTo ("/cgi-bin/member-menu.cgi");
    } else {
        RedirectTo ("/cgi-bin/bad-passowrd.cgi");
    }
} else {
    RedirectTo ("/cgi-bin/register.cgi");
}
```

When a user clicks on a button on the Web page, it might not be known in advance what new page needs to be displayed. An example of this is when a user tries to login with their user ID and password. Let us call that the "password" page. When the "enter" button on the "password" page is clicked by the user, this invokes a URL on the Web server for the "login" page, which in fact does not display anything. The "login" URL computes whether or not the user id and password are correct. If they are correct, then the "member-menu.cgi" page may be displayed next. If the user id is valid but the password is wrong, a "bad-password.cgi" page may be displayed next to let the user know that wrong password has been entered. If the user ID is invalid, it may be assumed that this is a new user and display the "register.cgi" page next. This may be accomplished by using the Perl code above to REDIRECT the client browser to the URL for either the "member-menu.cgi", "bad-password.cgi", or "register.cgi" pages.

The Perl program determines whether or not it is running on the virtual domain name or a physical domain name, dynamically constructs the proper new HTTPS URL, and returns a redirect message (e.g., "302 REDIRECT" message) to the client browser along with the new URL. When the client browser receives this redirect message with new URL, the browser dispatches a new GET request using the new URL to the server specified by the new URL.

Besides merely getting the redirection done, the Perl program accomplishes other important tasks. For example, the redirect message may be used to instruct the client browser to use the HTTPS secured version of the page instead of the HTTP non-secured version. Additionally, the redirect message may also be used to overcome problems associated with trying to load a target frame from a different frame.

Another way to overcome the problem associated with frame ownership is to reload the parent frame which contains instructions to build the child frames (e.g., index frame and content frame) instead of trying to load one frame from another frame. By reloading the parent frame, the problems associated with ownership may be avoided since the parent frame has ownership or authority to load either child frames.

Figure 5:
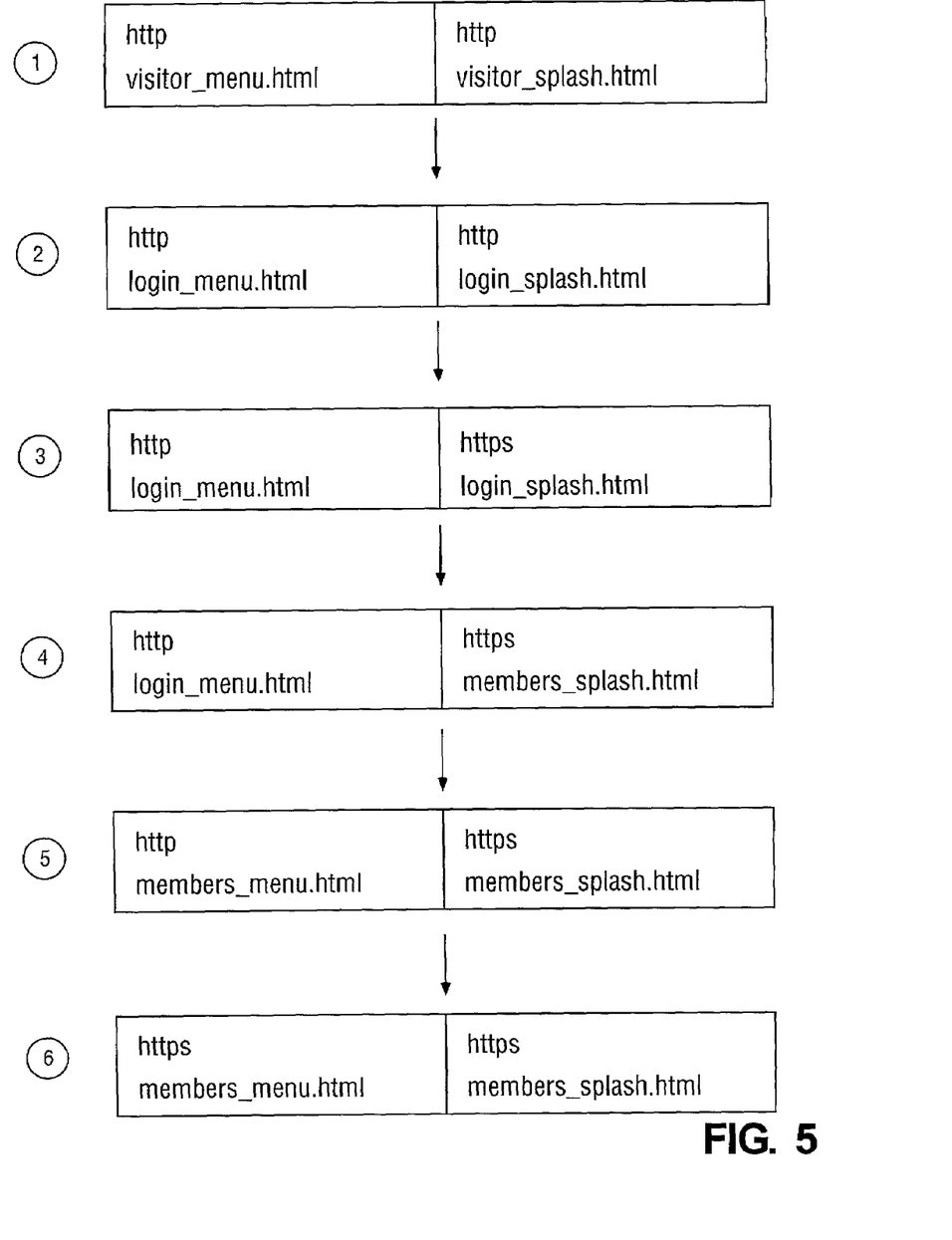
FIG. 5 is a block diagram illustrating an example of sequence of events to change frames of a Web page from HTTP protocol to HTTPS protocol according to one embodiment of the invention.

Referring to FIG. 5, a sequence of transitions to change frames of a Web page from HTTP to HTTPS according to one embodiment of the invention is shown. In first sequential event, when client browser requests to access a Web site (e.g., www.domain_name.com), two frames may be returned from the servers hosting the Web site. For example, the index frame (e.g., http://visitor_menu.html) may be loaded from one of the servers (e.g., www1) and the content frame (e.g., http//visitor_splash.html) may be loaded from another server (e.g., www2). After both frames have been properly loaded in the browser, the user may point and click on an item (e.g., current subscriber button) in the index frame to move from an unsecured area to a secured area of the Web site. To go from an unsecured area to a secure area, it is desirable reload both frames using HTTPS protocol to provide secure connection between the client's browser and the Web servers.

When the index frame tries to load the content frame with a new HTML document, the browser may return an error message indicating that the first frame whose owner is www1 does not have ownership to change the second frame whose owner is www2. In this case, redirection technique discussed above may be employed to force the second frame with the new HTML document. In response to the user clicking the "current subscriber" button embedded in the index frame that allows the user to log in, the index frame is reloaded with a new HTML document called "login_menu.html" and the content frame is reloaded with "login_splash.html" as shown in the second sequential event. As mentioned earlier, the redirection message generated by the Web server may be used to load the content frame.

The "login_splash.html" includes JavaScript for enabling the content frame to reload itself using the HTTPS protocol, as described above. Accordingly, "https://login_splash.html" page is invoked in the third sequential event. Then in forth sequential event, when the user enters proper user ID and password, this causes the content frame to load "https://members_splash.html." Once the user has successfully logged into the secured area (e.g., member area) of the Web site, the index frame also gets reloaded with "http://members_menu.html." The redirection technique may be employed to enable the content frame to load the index frame which may be owned by different server. The "http://members_menu.html" page includes JavaScript to allow the index frame to reload itself using the HTTPS protocol.

The sequential events 1 through 6 are provided to illustrate one example of how a Web page containing multiple frames can transition from one protocol (HTTP) to another protocol (HTTPS) where the Web page is hosted by a Web site utilizing a load balancer and a parallel array of servers. The above illustrated sequential events are carried out with minimal intervention by the user.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A system comprising:
a load balancer to receive requests from a client browser via a network, said requests dispatched by a Web page having a first frame and a second frame; and
a plurality of servers coupled to said load balancer to process said requests routed by said load balancer, each server executing a software code to generate a new uniform resource locator (URL) and return a redirect message with the new URL to said client browser in response to a request received from a requesting frame to load a data object for a target frame that is different from the requesting frame, wherein when the client browser receives said redirect message with the new URL, the browser dispatches a new request using the new URL to a server specified by the new URL.

2. The system of claim 1, wherein said software code generates said new URL and returns said redirect message if an owner of the target frame is different from an owner providing the data object.

3. The system of claim 1, wherein said plurality of servers is used to host a Web site having a secured area and an unsecured area.

4. The system of claim 3, wherein at least one of Hypertext Markup Language (HTML) documents of said Web site contains a software code to automatically invoke Hypertext Transfer Protocol Secure (HTTPS) protocol when a client user enters said secured area from said unsecured area.

5. The system of claim 4, wherein said software code automatically invokes HTTPS protocol by building a new URL by concatenating https:// with a domain name of the Web site.

6. The system of claim 1, wherein said load balancer is capable of performing Secure Sockets Layer (SSL) encryption and decryption using hardware-based accelerator circuitry.

7. The system of claim 6, wherein communication between said load balancer and the plurality of servers is transmitted as cleartext.

8. A method comprising:
receiving requests from a client browser via a network, said requests dispatched by a Web page having a first frame and a second frame;
routing said requests to one server in an array of servers to process said requests; and
in the event (1) a request is received from a requesting frame to load a data object for a target frame and (2) an owner of the requesting frame is different from an owner providing the data object,
(i) generating a new uniform resource locator (URL), and
(ii) returning a redirect message with the new URL to said client browser.

9. The method of claim 8, further comprising:
receiving by the client browser said redirect message with the new URL transmitted by one of said servers; and
dispatching by the client browser a new request using the new URL to a server specified by the new URL.

10. The method of claim 8, wherein each server in said array of servers is coupled to a load balancer and each server is used to host a Web site having a secured area and an unsecured area.

11. The method of claim 10, further comprising automatically invoking Hypertext Transfer Protocol Secure (HTTPS) protocol when a client user enters said secured area from said unsecured area.

12. The method of claim 11, wherein said automatically invoking is carried out by a software code embedded within a Hypertext Markup Language (HTML) document to build a new URL by concatenating https:// with a domain name of the Web site.

13. The method of claim 11, further comprising performing Secure Sockets Layer (SSL) encryption and decryption in the load balancer coupled to said array of servers when HTTPS protocol has been invoked.

14. The system of claim 8, wherein communication between a load balancer and the servers is transmitted as cleartext.

15. A machine-readable medium that provides instructions, which when executed by a processor, cause said processor to perform operations comprising:
receiving a request from a requesting frame of a client browser to load a data object for a target frame; and
determining if an owner of the target frame is different from an owner providing the data object,
if so, then
generating a new uniform resource locator (URL), and
returning a redirect message with the new URL to said client browser.

16. The machine-readable medium of claim 15, wherein when the client browser receives said redirect message with the new URL, the browser dispatches a new request using the new URL to a server specified by the new URL.

17. The machine-readable medium of claim 15, wherein said redirect message is used to instruct the client browser to switch from Hypertext Transfer Protocol (HTTP) to Hypertext Transfer Protocol Secure (HTTPS).

* * * * *

UNITED STATES PATENT AND TRADEMARK OFFICE
CERTIFICATE OF CORRECTION

PATENT NO. : 7,093,279 B2
APPLICATION NO. : 09/821503
DATED : August 15, 2006
INVENTOR(S) : Tretheway et al.

It is certified that error appears in the above-identified patent and that said Letters Patent is hereby corrected as shown below:

On Title Page
Item (75), at line 1 of the Inventors, delete "Tretheway" and insert --Trethewey--.
Column 4, at line 5, delete "HTTF" and insert --HTTP--.

Signed and Sealed this

Fourth Day of December, 2007

JON W. DUDAS
*Director of the United States Patent and Trademark Office*